US00RE44248E

(19) United States
(12) Reissued Patent
Poirier

(10) Patent Number: US RE44,248 E
(45) Date of Reissued Patent: May 28, 2013

(54) SYSTEM FOR TRANSFERRING PERSONALIZE MATTER FROM ONE COMPUTER TO ANOTHER

(76) Inventor: Darrell A. Poirier, Quinebaug, CT (US)

(21) Appl. No.: 13/436,519

(22) Filed: Mar. 30, 2012

Related U.S. Patent Documents

Reissue of:
(64) Patent No.: 7,689,416
Issued: Mar. 30, 2010
Appl. No.: 10/763,966
Filed: Jan. 23, 2004

U.S. Applications:
(63) Continuation-in-part of application No. 09/676,328, filed on Sep. 29, 2000, now abandoned.

(60) Provisional application No. 60/156,638, filed on Sep. 29, 1999, provisional application No. 60/214,504, filed on Jun. 28, 2000.

(51) Int. Cl.
*G10L 15/26* (2006.01)

(52) U.S. Cl.
USPC ..... 704/235; 704/257; 704/275; 704/9; 704/231; 704/246

(58) Field of Classification Search
USPC ..... 704/235, 260, 270–275, 9, 231, 246, 704/251, 257
See application file for complete search history.

(56) References Cited

U.S. PATENT DOCUMENTS

| | | | |
|---|---|---|---|
| 4,922,538 | A | 5/1990 | Tchorzewski |
| 5,027,406 | A | 6/1991 | Roberts et al. |
| 5,425,128 | A | 6/1995 | Morrison |
| 5,600,781 | A | 2/1997 | Root et al. |
| 5,717,820 | A | 2/1998 | Hamasaki et al. |

(Continued)

FOREIGN PATENT DOCUMENTS

| | | | |
|---|---|---|---|
| EP | 0965979 | A1 | 6/1999 |
| WO | WO2000049601 | | 8/2000 |

OTHER PUBLICATIONS

Article 1: An e-mail dialog in which Michael Bliss asked for instructions on transferring user voice files to another computer on Jun. 26, 1998, and Marty Tibor of Synapse Adaptive, provided a link to Article 2 below, on Jun. 29, 1998. Printed from http://www.voicerecognition.com/voice-users/archive/1998/3598.html on Feb. 24, 2011.

(Continued)

*Primary Examiner* — Vijay B Chawan
(74) *Attorney, Agent, or Firm* — Blodgett & Blodgett, P.C.; Gerry A Blodgett

(57) ABSTRACT

This invention combines methodologies that enhance voice recognition dictation. It describes features for moving speaker voice files eliminating redundant training of speech recognition dictation applications. It defines how to create synthetic voice models reducing speaker dependency. It combines accuracy and performance into a single measure called RAP Rate. Moreover, the invention describes enhancing voice recognition applications and systems by measure/adjusting hardware and software features for optimal voice recognition dictation incorporating methodical processes based on RAP Rate. Using these approaches and tools the invention includes a method for constructing a handheld transcriber that immediately translates audio speech into text with real-time display. The invention describes a method for applying RAP Rate and synthetic voice models to applications like voice mail to text. With the ability to move and translate voice models the invention describes new services that could be provided for a fee.

74 Claims, 9 Drawing Sheets

U.S. PATENT DOCUMENTS

| | | | | |
|---|---|---|---|---|
| 5,724,410 | A | 3/1998 | Parvulescu et al. | |
| 5,774,841 | A | 6/1998 | Salazar et al. | |
| 5,818,800 | A | 10/1998 | Barker | |
| 5,822,727 | A | 10/1998 | Garberg et al. | |
| 5,825,921 | A | 10/1998 | Dulong | |
| 5,850,627 | A | 12/1998 | Gould et al. | |
| 5,881,312 | A | 3/1999 | Dulong | |
| 5,956,683 | A * | 9/1999 | Jacobs et al. | 704/270.1 |
| 5,960,063 | A | 9/1999 | Kuroiwa et al. | |
| 5,995,936 | A | 11/1999 | Brais et al. | |
| 6,014,624 | A | 1/2000 | Raman | |
| 6,029,195 | A | 2/2000 | Herz | |
| 6,067,516 | A | 5/2000 | Levay et al. | |
| 6,067,517 | A * | 5/2000 | Bahl et al. | 704/256.4 |
| 6,073,097 | A | 6/2000 | Gould et al. | |
| 6,073,103 | A | 6/2000 | Dunn et al. | |
| 6,092,043 | A | 7/2000 | Squires et al. | |
| 6,101,468 | A | 8/2000 | Gould et al. | |
| 6,108,628 | A | 8/2000 | Komori et al. | |
| 6,122,614 | A | 9/2000 | Kahn et al. | |
| 6,128,482 | A | 10/2000 | Nixon et al. | |
| 6,163,768 | A | 12/2000 | Sherwood et al. | |
| 6,175,822 | B1 | 1/2001 | Jones | |
| 6,212,498 | B1 | 4/2001 | Sherwood et al. | |
| 6,260,013 | B1 | 7/2001 | Sejnoha | |
| 6,275,805 | B1 | 8/2001 | Fado et al. | |
| 6,308,158 | B1 * | 10/2001 | Kuhnen et al. | 704/275 |
| 6,317,484 | B1 | 11/2001 | McAllister | |
| 6,327,343 | B1 | 12/2001 | Epstein et al. | |
| 6,342,903 | B1 | 1/2002 | Fado et al. | |
| 6,366,882 | B1 | 4/2002 | Bijl et al. | |
| 6,374,221 | B1 * | 4/2002 | Haimi-Cohen | 704/256.1 |
| 6,401,066 | B1 | 6/2002 | McIntosh | |
| 6,415,258 | B1 | 7/2002 | Reynar et al. | |
| 6,424,943 | B1 | 7/2002 | Sherwood et al. | |
| 6,430,551 | B1 | 8/2002 | Thelen et al. | |
| 6,477,491 | B1 | 11/2002 | Chandler et al. | |
| 6,477,493 | B1 | 11/2002 | Brooks et al. | |
| 6,556,971 | B1 | 4/2003 | Rigsby et al. | |
| 6,594,628 | B1 * | 7/2003 | Jacobs et al. | 704/231 |
| 6,636,961 | B1 | 10/2003 | Braun et al. | |
| 6,654,955 | B1 | 11/2003 | Kusnitz et al. | |
| 6,674,451 | B1 | 1/2004 | Fado et al. | |
| 6,725,194 | B1 | 4/2004 | Bartosik et al. | |
| 6,751,590 | B1 | 6/2004 | Chaudhari et al. | |
| 6,775,651 | B1 | 8/2004 | Lewis et al. | |
| 6,785,647 | B2 * | 8/2004 | Hutchison | 704/231 |
| 6,785,847 | B1 * | 8/2004 | Jordan et al. | 714/37 |
| 6,868,379 | B1 | 3/2005 | Wutte | |
| 6,885,736 | B2 | 4/2005 | Uppaluru | |
| 6,952,675 | B1 | 10/2005 | Tahara et al. | |
| 6,961,699 | B1 | 11/2005 | Kahn et al. | |
| 6,983,248 | B1 | 1/2006 | Tahara et al. | |
| 7,006,967 | B1 | 2/2006 | Kahn et al. | |
| 7,212,969 | B1 | 5/2007 | Bennett | |
| 2002/0095290 | A1 * | 7/2002 | Kahn et al. | 704/260 |

OTHER PUBLICATIONS

Article 2: Gould, Joel, "Moving Speech files Around", web address http://www.synapseadaptive.com/joel/moving_speech_files.htm, last revised Feb. 23, 1998, currently available, original publication unknown.

S0165168400000281-1, Gilloire et al.,"Innovative Speech Processing for Mobile Terminals"Signal Processing 80 (2000) 1149-1166, published by Elsevier Science B.V.

S0167639399000801-1 Doddington, et al. "The NIST Speaker Recognition Evaluation" Speech Communication, 31 (2000) 225-254, published by Elsevier Science B.V.

Brandhagen, Randy. "Recognizing Users" E-mail to the Sez! Speech Recognition Forum. Mar. 19, 1998 at 20:14:52, answer by Phantom. Mar. 21, 1998 at 07:42:26.

BM ViaVoiceTM 98 Home Edition User Guide, First Edition (Jul. 1998), International Business Machines Corporation 1998.

This reference is a collection of elements of an online dialog that occurred on a list site at medspeech@list.sirius.com between May 12, 1998 and May 13, 1998. It was found by searching for "moving voice files".

* cited by examiner

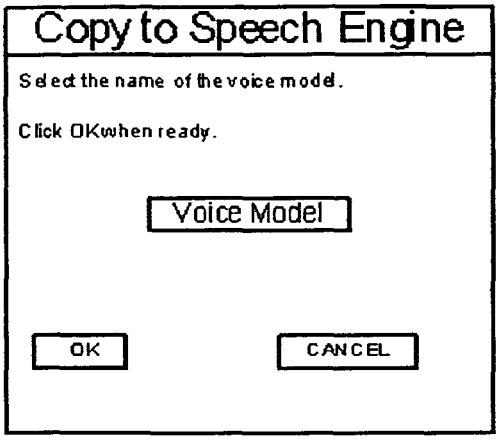
Figure 4
Figure 5
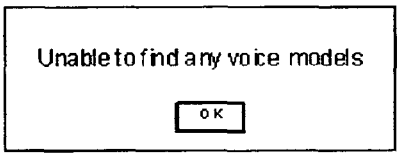
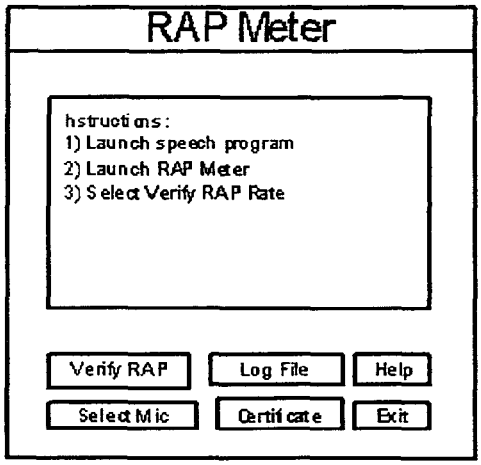
Figure 6
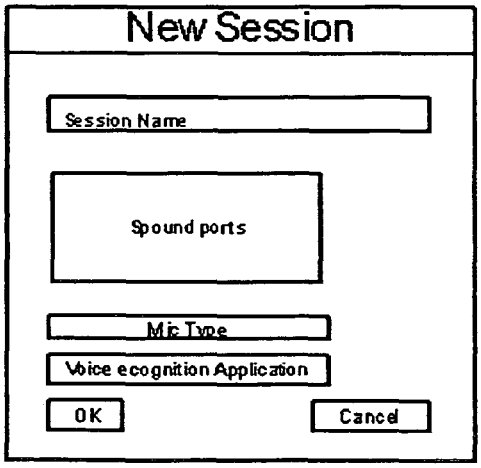
Figure 7

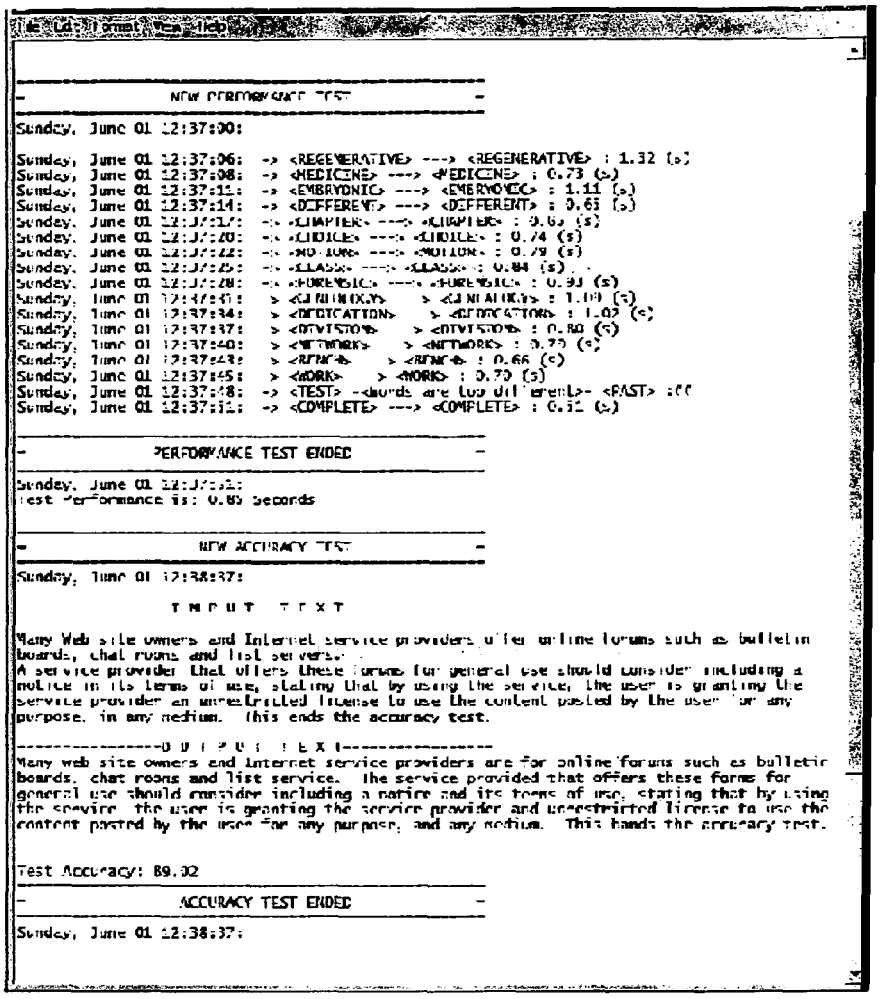

```
NEW PERFORMANCE TEST

Sunday, June 01 12:37:00:

Sunday, June 01 12:37:06:  -> <REGENERATIVE> ---> <REGENERATIVE> : 1.32 (s)
Sunday, June 01 12:37:08:  -> <MEDICINE> ---> <MEDICINE> : 0.73 (s)
Sunday, June 01 12:37:11:  -> <EMBRYONIC> ---> <EMBRYONIC> : 1.11 (s)
Sunday, June 01 12:37:14:  -> <DIFFERENT> ---> <DIFFERENT> : 0.61 (s)
Sunday, June 01 12:37:17:  -> <CHAPTER> ---> <CHAPTER> : 0.65 (s)
Sunday, June 01 12:37:20:  -> <CHOICE> ---> <CHOICE> : 0.74 (s)
Sunday, June 01 12:37:22:  -> <MOTION> ---> <MOTION> : 0.79 (s)
Sunday, June 01 12:37:25:  -> <CLASS> ---> <CLASS> : 0.84 (s)
Sunday, June 01 12:37:28:  -> <FORENSIC> ---> <FORENSIC> : 0.93 (s)
Sunday, June 01 12:37:31:  > <GENUINE> > <GENUINE> : 1.09 (s)
Sunday, June 01 12:37:34:  > <MODIFICATION> > <MODIFICATION> : 1.02 (s)
Sunday, June 01 12:37:37:  > <ENTITIES> > <ENTITIES> : 0.80 (s)
Sunday, June 01 12:37:40:  > <NETWORK> > <NETWORK> : 0.75 (s)
Sunday, June 01 12:37:43:  > <RENT> > <RENT> : 0.66 (s)
Sunday, June 01 12:37:45:  > <WORK> > <WORK> : 0.70 (s)
Sunday, June 01 12:37:48:  -> <TEST> --words are too different-- <FAST> :(((
Sunday, June 01 12:37:51:  -> <COMPLETE> ---> <COMPLETE> : 0.51 (s)

PERFORMANCE TEST ENDED

Sunday, June 01 12:37:51:
Test Performance is: 0.85 Seconds

NEW ACCURACY TEST

Sunday, June 01 12:38:37:

INPUT TEXT

Many Web site owners and Internet service providers offer online forums such as bulletin
boards, chat rooms and list servers.
A service provider that offers these forums for general use should consider including a
notice in its terms of use, stating that by using the service, the user is granting the
service provider an unrestricted license to use the content posted by the user for any
purpose, in any medium. This ends the accuracy test.

----------OUTPUT TEXT----------
Many web site owners and Internet service providers are for online forums such as bulletin
boards, chat rooms and list service. The service provided that offers these forms for
general use should consider including a notice and its terms of use, stating that by using
the service, the user is granting the service provider and unrestricted license to use the
content posted by the user for any purpose, and any medium. This hands the accuracy test.

Test Accuracy: 89.02

ACCURACY TEST ENDED

Sunday, June 01 12:38:37:
```

Figure 10

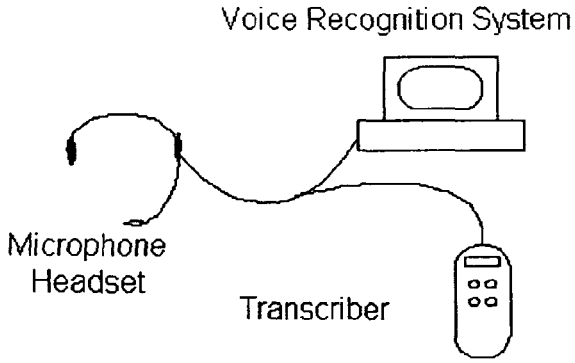

Figure 11

Loaded Software

- Windows 98
-Dragon Naturally Speaking
- Includes Voice Command
- USB disk & Network file xfer

Figure 16

| Y | BIOS CONFIGURATION FEATURES | COMMENTS |
|---|---|---|
| | boot virus disabled | |
| | CPU level one cash enable<br>CPU level to cash enable<br>CPU level to cash ECC enabled | |
| | BIOS update enabled<br>turbo mode disabled | |
| | quick power on self test enabled | |
| | boot floppy disabled<br>who sequence = 8, C | |
| | IDE first | |
| | Floppy access control read/write<br>IDE HDD block mode sectors disabled | |
| | smart disabled | |
| | PS/2 auto | |
| | OS/2 on-board memory disabled | |
| | PCI/VGA palettes snoop disabled<br>video ROM shadow | |
| | Boot of number lock off | |
| | Defaults on the rest | |
| | **CHIP SET FEATURES** | |
| | SDRAM by SPD | |
| | SDRAM MA wait state = normal<br>snoop ahead: enabled | |
| | host bus fast data recovery: disabled<br>16-bit I/O rec time: 4 bus clock<br>8-bit I/O rec time: 8 bus clock | |
| | graphics aperture size: 64 MB<br>video memory cache mode: UC | |
| | memory hole at 15 m – 16 m: disabled | |
| | on-board floppy: enabled<br>on-board floppy drive swap: disabled | |

SYSTEM FOR TRANSFERRING PERSONALIZE MATTER FROM ONE COMPUTER TO ANOTHER

Matter enclosed in heavy brackets [ ] appears in the original patent but forms no part of this reissue specification; matter printed in italics indicates the additions made by reissue.

CROSS-REFERENCE TO RELATED APPLICATIONS

This application *is a reissue application of U.S. Pat. No. 7,689,416, which was derived from U.S. patent application Ser. No. 10/763,966, filed on Jan. 23, 2004, which* claims the benefit under 35 U.S.C. §119(e) of U.S. Provisional Patent Application No. 60/156,638, filed Sep. 29, 1999, and U.S. Provisional Patent Application No. 60/214,504, filed on Jun. 28, 2000, and claims the benefit under 35 U.S.C. §120 as a continuation-in-part of U.S. patent application Ser. No. 09/676,328, filed Sep. 29, 2000, now abandoned of which applications are hereby incorporated herein by reference.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

1. Field of the Invention

This invention relates to computer voice recognition enhancements. It explains methodologies for measuring reliability, accuracy, and performance as system responsiveness using a standardized method of measurement. The invention introduces a method of machine independent user mobility between different voice recognition systems. It addresses a method for enabling speaker independent voice recognition for masses of people without the need for training or enrollment. It describes how to apply the technology to a new style of interactive real time voice to text handheld transcriber including visual feedback to replace the previous handheld transcribers that are only recording devices. It describes using these techniques in a system that translates voice mail audio into text readable messages.

2. Field of the Related Art

Prior to voice recognition dictation, transcription was completely done by humans. Some inventions enhanced this situation by providing a means to make it faster and easier for the transcriptionist to work with the audio file that needed to be transcribed. An example is U.S. Pat. No. 6,175,822 Bryce Alan Jones (Method and System for Providing Network Base Transcription Services) where the audio file is captured at one location and sent over the Internet and played back to a transcriptionist at a second location removing the requirement of the transcriptionist to be at the location where the dictation was taking place. Over time features were added to audio files including a parallel processing using speech recognition. An example of this is U.S. Pat. No. 6,073,103 Dunn et al. (Display Accessory for Record Playback System) where it is described how to combine audio voice input and speech recognition applications to identifying numbers in the voice audio files. This gives a user the ability to index into the audio where the numbers are located. Another feature added was the ability to capture audio when the speech recognition was turned off to avoid loss of any of the spoken words, as described in U.S. Pat. No. 6,415,258 Reynar et al. (Background Audio Recovery System).

In general terms however, voice recognition dictation products that are presently in the market follow the typical clone PC market strategy. The state of the art is buying a personal computer that is designed as a general purpose computing device, installing voice recognition software (i.e. IBM ViaVoice, L&H Voice Express, Philips Speech Pro from Philips, Dragon Naturally Speaking, from Dragon Systems), and using that configuration as a Large Vocabulary Voice Recognition dictation system. When using Large Vocabulary Voice Recognition (LVVR) applications in the clone PC environment, two problems are experienced: machine dependency and speaker dependency. While this approach is typically used throughout the computer industry, it often leaves users frustrated with accuracy and performance of the voice recognition applications.

This is especially true when applying the technology to a hand held transcriber type of devices like a tape recorder or digital voice recorder. The industry standard for handheld dictation is to use handheld tape recorders or memory devices that provide the same functionality as tape recorders, i.e. a handheld digital reorder. Voice recognition software packages supported connections from these handheld devices to desktop types of computers allowing the voice to be translated into text through a voice recognition package like IBM's ViaVoice voice recognition software. These approaches have many problems including: No direct feedback while the dictation is taking place, it was not real time large vocabulary voice recognition, training for the voice recognition was cumbersome to accomplish resulting in poor accuracy and user frustration, and training required redundant work since a separate voice model is needed from the desktop speaker voice files. Moreover, updating the voice parameters and training was typically not possible or very difficult to accomplish resulting in the accuracy level not getting better over time. And lastly, a separate physical connection to the dictation device was needed to accomplish the translation to text with little to no control of manipulating the text output until the entire recorded voice was dumped and translated into text.

The voice recognition dictation systems require the training sessions to enable the system to identify the words of a person is speaking. The process of training a voice recognition system creates speaker voice files or a "Voice Model". A "Voice Model" is defined here as a signal, information, or electronic data file that is information and/or parameters that representation of a person's voice or a noise. A Voice Model contains attributes that characterize specific speaking items such as formants, phonemes, speaking rate, pause length, acoustic models, unique vocabulary's, etc. for a given user. One use for a voice model that contains data and parameters of a specific user is that it allows the user to take advantage of Large Vocabulary Voice Recognition (LVVR) dictation applications. All approaches to LVVR (e.g. Acoustic phonetic, Pattern recognition, Artificial intelligence, Neural networks, etc.) require some training. Training is required to create a reference pattern from which decisions are made using templates or statistical models (e.g. Markov Models and Hidden Markov Models) as to the probability of the audio word to be translated to a text displayed word. When using Large Vocabulary Voice Recognition applications, training of the voice recognition software allows the software to identify words during the uniqueness of a specific person speaking. Since training can be time consuming and ongoing task and typically results in speaker dependency other inventions have avoided confronting the training and speaker voice models issues needed to accomplish speaker independent and/or mobility between voice recognition dictation systems. As an example, the problem exists and was described within U.S. Pat. No. 5,822,727 Garberg et al. (Method for Automatic Speech Recognition and Telephony) where voice recognition training is accomplished using sub-words of a current speaker compared with templates for a plurality of speakers. This patent recognizes that there is a need for a more convenient and thorough process for building a database of sub word transcriptions and a database using speaker independent templates.

U.S. Pat. No. 6,477,491 Chandler et al. describes needing training for voice recognition applications but does not provide any specific means to accomplish this task and is focused on providing identity of a specific person by the specific microphone they are speaking into.

Therefore it is generally accepted that upfront training to gain an acceptable level of accuracy and system responsiveness requires time and effort as the system learns a specific user. This investment of time and effort is a per machine cost adding to machine dependency. Training a voice recognition system will result in a specific system voice to text translation accuracy in a given time indicating system responsiveness/performance. When trying to determine and obtain the highest level of system accuracy and performance, one can spend much effort, time, and money trying to determine the best options, (performance and accuracy versus components, effort, and cost). This has led to frustration and funds wasted with the result being that the speech recognition system is left sitting on the shelf or discarded.

Many professional people use more than 1 computer to accomplish their daily task. When more than 1 computer is used for voice recognition, accuracy and performance may not be consistent due to different levels of training accomplished for each system. This was discovered through experimentation with voice recognition packages and was verified in talking with doctors, lawyers, and other professionals that use speech recognition. These users described accuracy for example, at an estimated 94 percent but all claimed that they didn't know accurately what the accuracy was. Other statements made included how accuracy would vary when using an assortment of machines for voice dictation.

This invention is targeting to resolve the specific problems of measuring a standard performance and standard accuracy, machine dependency, speaker dependency, mobility, and methods of estimating accurate cost for users and manufacturers.

BRIEF SUMMARY OF THE INVENTION

This invention includes several components that provide enhancements and ease of use features to voice recognition systems and applications. In accordance with this invention, it is possible to reliably measure accuracy and responsiveness of a voice recognition system used for dictation purposes. With the ability to measure these key metrics other enhancements can then be added to voice recognition systems with a quick and easy determination of system improvement or degradation. One such enhancement described is the ability to move speaker voice models (Voice Modeled Mobility) between systems with the ability to quickly determine the success of a quick user enrollment versus a full training session of a voice recognition system. The measurements can also be applied to a new type of handheld transcriber with internal voice dictation software eliminating the need for a two-step process of recording the dictation notes and then transferring them to the voice recognition software for a speech to text translation. Further advantages can be achieved by applying the RAP Rate measurement techniques to engineering and manufacturing processes resulting in products that have a common reference and relationships providing a known value to industry, users, and customers prior to purchasing the voice dictation product. Applying the RAP Rate measurement techniques with other techniques for determining voice recognition user speech patterns (described in detail later) enables the creation of a new type of speaker voice model or a (Super Voice Model) that can be applied to many people without the prerequisite of training or voice recognition system enrollment. In overview this invention includes components that measure voice recognition metrics (RAP meter), provide ease of use for the movement of speaker voice models (Voice Model Mobility), a handheld transcriber that includes voice recognition software for dictation internal to the transcriber (Powerful Handheld Device), a process for the manufacturing and verification of systems used for voice dictation purposes (RAP Rate Manufacturing Process), a methodology for creating speaker independent voice models (Super Voice Model), and applying these techniques of RAP Meters, Voice Model Mobility, Super Voice Model, and Powerful Handheld Devices to a Audio Voice Mail to Text Translation system. These components and their related features and advantages are described in the description of the preferred embodiment using the drawings as reference.

BRIEF DESCRIPTION OF THE DRAWINGS

FIG. 4 displays the user control screen of the Voice Model Mobility software used when moving a voice model from media into a speech recognition application. There is a button to select the voice model and OK and cancel buttons.

FIG. 5 indicates a Voice Model Mobility error handling dialog box example indicating to the user attempting to move voice model that the voice model was not successfully moved.

FIG. 6 illustrates the RAP Meter software opening screen. It contained six buttons and a display area to provide visual feedback to the user. The "Verify RAP Rate" button launches a user screen to perform the RAP Rate test. "The Select Mic" button allows the tests user to select a specific microphone on the system being used. The "Log File" button is a file that the user can review to see specific details of the Rap Rate test. The "Certificate Button" displays a certificate that can be shared with others indicating what level of Rap Rate the system under test achieved. The "Help" button displays the Rap Meter online help documentation, and the "Exit" button exits the RAP Meter program.

FIG. 7 illustrates the first opening screen of a RAP Rate test session. This screen enables the user to input specific information about the test to be performed including test name, voice recognition software used, and specific hardware options like the microphone or sound input port to be used for the test.

FIG. 10 is an example of a RAP Rate log file From a Typical RAP Rate test run. It illustrates the detailed test results for the performance in the accuracy test and also includes system specific configuration.

FIG. 11 shows a microphone and a hand held transcriber connected to a voice recognition system using a Y connector cable enabling simultaneous training of the voice recognition system for a microphone and transcriber input devices.

FIG. 16 illustrates a process sheet to support the RAP Rate manufacturing process.

DETAILED DESCRIPTION OF THE INVENTION

Figure 1:
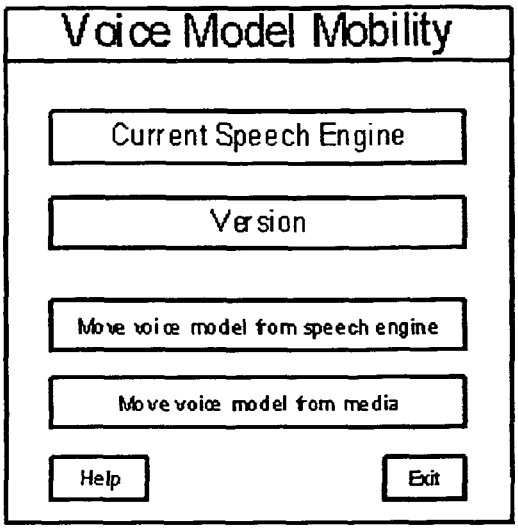
FIG. 1 is the opening screen of a software application called Voice Model Mobility. It displays the voice recognition application being used (current speech engine) and its related software version. It also has four buttons for controlling the application including moving speaker voice models from the voice recognition application (Move voice model from speech engine), moving voice models to the speech recognition application (Move voice model from media), and help and exit buttons.

It is the object of this invention to provide a method for transferring voice models defined as Voice Model Mobility. Voice Model Mobility (VMM) was originally conceived due to the problem of having to train multiple voice recognition dictation machines for a single person's voice. This was discovered when experimenting with voice recognition dictation applications. It was determined that a better way to use multiple machines was to separate the files and parameters that characterize the user, package the files and parameters as a voice model and move them to a medium for transfer and installation into another separate system. Voice models and a means to package, move them, and install them can and should be independent of the voice recognition applications allowing the owner of a voice model the ability to plug into and use any voice recognition machine. Voice models and training are assumed needed and can be time-consuming therefore; voice recognition applications provided backup mechanisms to restore voice files to their original locations. They did not however, provide a means to transfer voice models between systems. Prior to VMM, moving voice models between voice recognition systems did not exist and there was no easy way to move these specific user parameters and data between machines. Several experiments were done in effort of understanding why the voice recognition applications did not support such features. From these experiments it was discovered that the lack of ability to create and move a voice model was not technical. The first experiment was to use the backup and save feature provided with the Dragon Professional voice recognition application. The problems encountered when trying to accomplish this included a different filename when restoring the user from when the user was saved. Another problem was the limitation of where the backup could be saved. In other words the voice model was not mobile. The second experiment was to copy the voice model files directly to another location and then copy them back to use them. In some cases this approach appeared to work although it took some trial and error until the exact files that needed to be copied were discovered. Crashes and hangs occurred often. Problems encountered prior to successful file copies included; user voice files contamination, the system hanging when trying to open a specific user, or the Dragon application no longer finding the user for opening. Although this approach sometimes yielded success it was discovered that the user would have to be created first, and then the files could be copied. This was due to registry entries not being setup as part of the copy process. A Visual Basic prototype was coded using this method for user interface experimentation. The third effort included investigation of the system registry to determine if Dragon was setting any parameters using the registry. This was found to be true and solved the final problems. The current version of VMM is coded in the C programming language.

Figure 2:
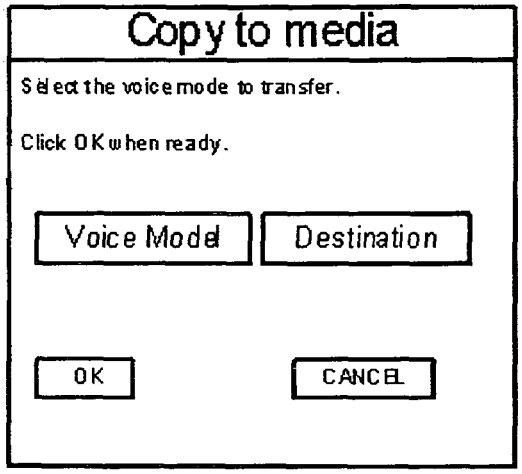
FIG. 2 illustrates the user control screen of the Voice Model Mobility software used when copying a voice model from the speech engine to media (disk drive, tape drive, writable CD, network, or other transfer medium). It has for user control's including voice model selection button, destination button, and OK and cancel button.

The ability to unplug these parameters and data from one machine and transfer the files to another machine using mediums like disk, optical disk, floppy, network, etc. is defined here as Voice Model Mobility (VMM). Voice Model Mobility as described here is a software application. However, people skilled in the art will recognize that the specific functionality could be included as part of a hardware pluggable device. Referencing FIGS. 1 through 5, FIG. 1 illustrates the start up screen from voice model mobility software. The opening screen contains two buttons to control the movement of voice models between media and voice recognition systems. FIG. 2 illustrates another screen of the user interface. This screen is displayed when de-installing or moving a voice model from the speech recognition program to a storage medium. The user selects the voice model to be used and the destination where the voice model will be stored. When the user selects the OK button, a software execution process begins copying the user's parameters, and other files that make up the voice model. The process creates a catalog of the voice model system environment (parameters) and packages the files into a central location with a log file, information file, and initialization file to support future movement of the specific voice model. For VMM, more specifically, the sequence of events includes:

1. User clicks "Move voice model to Media" button.
2. A folder labeled "Users" is created on the destination media.
3. A "users.ini" file is created in the Users folder. This file is a logical translation from Username to a user file name that Dragon will open.
4. VMM then creates and writes the user specific registry information into a file called VMMinfo.txt 5. A "user" specific folder will be created in the Users folder. There are several files in the user specific folder.
6. The user as a result of the Dragon training process creates the files listed below. These files are copied to the CDWriter using the standard Dragon directory structure. Files included are:

| audioin.dat |
|---|
| Current Folder containing: |
| topics (configuration file) |
| options (configuration file) |
| global.DVC |
| Voice folder |
| DD10User.sig |
| DD10User.usr |
| GeneralE Folder |
| dd10voc1.voc |
| dd10voc2.voc |
| dd10voc3.voc |
| dd10voc4.voc |
| General.voc |
| Shared Folder |
| archive. voc |

These files and related registry parameters information make up the voice model for this example for the Dragon Professional application.

Figure 3:
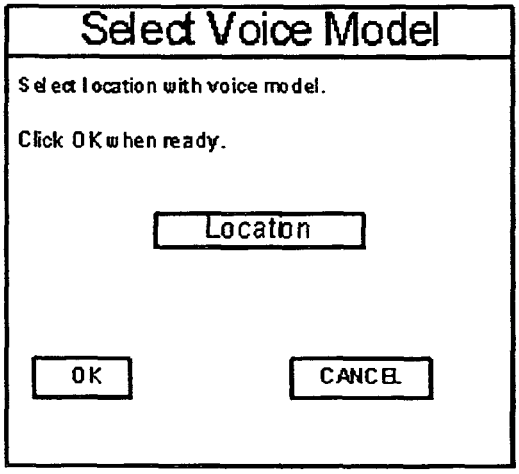
FIG. 3 displays the user control screen of the Voice Model Mobility software used when moving a voice model from media into a speech recognition application. This control allows the location of the voice model to be selected and OK and cancel button.

FIG. 3 is the screen displayed when installing a voice model into voice recognition system. From this screen and the follow-up screen shown in FIG. 4 the user selects a specific voice model and the location of the voice model to be used. When the user selects the OK button on FIG. 4 a software execution process starts reading and executing the VMM initialization files and deposits the voice recognition parameters and files into the operating systems registry and parameter configurations files. The sequence of events occurs as follows:

1. VMM pops up a user selection window asking for drive containing the voice model.
2. After the drive is selected, VMM looks on the selected drive for the Users folder containing the voice models, specifically, the users.ini files.
3. If VMM does not find any users, a window pops up saying that no users were found with an OK button to click returning the user to the previous screen as illustrated in FIG. 5.
4. If users exist, VMM then asks the user to select one of the voice models it found on the selected drive.
5. VMM then reads the file VMMInfo.txt file to determine the appropriate registry settings.
6. If the user already exists, VMM will prompt the user to ask if the existing user files should be overwritten.
7. If the user responds by clicking the OK button, then steps 8 onward will be executed, other wise VMM will go back to the main VMM screen.
8. If there is no user specific folder, then VMM creates the user specific folder in the standard Dragon hierarchical directory structure otherwise it uses the existing folder.
9. VMM then copies all the specific user files listed previously to the specific User folder.
10. VMM then configures the registry parameters for the selected user.

This methodology of voice model mobility could enhance many situations where training a voice recognition system is necessary, for example voice model mobility could enhance U.S. Pat. No. 6,477,491 Chandler et al. (System and Method for Providing Speaker Specific Records of Statements of Speakers) and Epstein et al. U.S. Pat. No. 6,327,343 (System and Method for Automatic Call and Data Transfer Processing) both mentioning the need of obtaining or assuming that a speaker voice model exists. Voice Model Mobility version 1.0 (VMM V1.0) is the first step toward the concept of modular plug-able voice models. This concept enables new features to be incorporated into voice models to provide enhancements on a wide variety of applications (e.g. security, learning aid for people speaking, singing, and language translation, voice mail to text, games, and guidance, etc.). While the concept of Voice Model Mobility could be applied with any voice recognition software, application or hardware, the VMM software application developed and used and described here is for example purposes and used Dragon Systems Voice Recognition Professional Application. The transfer medium could have been floppy disk, network, credit card strip, or other means of storing data.

The VMM prototype has been tested, debugged, and upgraded and is presently being used by many people. The current version works with high capacity floppy disks, network drives, CD media, and Internet network drives, and other removable storage media. Given future data compression and larger media capacities, the goal would be to put voice models on credit card type magnet strips requiring personalized the identification to enable the models, similar to credit cards and bank ATM cards of today. One embodiment of the invention could be described as a method for training a second speech recognition computer, so that the second speech recognition computer is more effective at speech recognition than it was prior to the training, comprising the steps of training a first speech recognition computer by causing the said first speech recognition computer to form first voice model files that contain the training result, and thereby to cause the first speech recognition computer to be more effective at speech recognition. Making the said first voice model files accessible to a second speech recognition computer, that is adapted to use the said first voice model files to enhance the effectiveness of the said second speech recognition computer at speech recognition, and causing the second speech recognition computer to use the said first voice model files to enhance the effectiveness of said second speech recognition computer at speech recognition. Another embodiment of the invention might be described as a speech recognition computer system, comprising a first computer including a memory, said memory containing a first installation of a speech recognition program, and said memory also containing first voice model files that are adapted to be used by the said speech recognition program to increase the accuracy of the said speech recognition program when the said first computer is used by a user to convert the speech of the user into text, said speech recognition program also containing a training module adapted to convert generic voice model files to the first voice model files by monitoring the conversion of the speech of the user into text, a second computer including a memory, said memory containing a second installation of the speech recognition program, and a transfer device adapted to copy the first voice model files from the first computer to the second computer in such a way that the first voice model files can be utilized by the second installation of the speech recognition program to increase the accuracy of the second installation of the speech recognition program when the said second installation of the speech recognition program is used by the user.

It is also the object of this invention to describe and provide a method for the translation of a Voice Model created in one voice recognition application (i.e. Dragon Voice Recognition Software) to be transferred and recognized by other LVVR applications (e.g. IBM ViaVoice, L&H, and Philips Speech Pro). The mechanics of translating voice models between LVVR applications include; 1) An information file is created identifying which parameters are needed for each type of LVVR systems. 2) The parameters are read from one LVVR system and translated to an LVVR common file format (.lvr). 3) The parameters are then formatted from the (.lvr) to the target voice recognition application format. 4) The file is then translated to the desired voce model format to create the final voice model. 5) The voice model is plugged-in to the destination LVVR system using the VMM techniques.

It is also the object of this invention to appreciate that services for storing, translating, and transferring voice models could be implement and a fee charged for such services. These services and/or software applications allow a user to have access to a proficient personalized Voice Model regardless of physical location or appliance being used. The voice model can be transferred electronically over wire or wireless transmission.

In yet another aspect of moving voice models between systems to enable mobility and a reduced system dependency, an alternate view is the ability to train a voice recognition system to recognized many uses with a single voice model, making the voice recognition system Speaker Independent. As stated earlier, when using Large Vocabulary Voice Recognition (LVVR) applications two problems are experienced. These are machine dependency and speaker dependency. Voice model mobility was a method to remove machine dependency. If many people want to use a specific voice recognition system for LVVR dictation using the current technology each person would have to train each machine to be used separately which is usually not feasible for the masses of people and potential numbers of systems.

It is the object of this invention to describe and provide a method for a new type of Voice Model called a Super Voice Model or SVM that has the ability to achieve speaker independent voice recognition. The technology that enables this ability is VMM for the movement of voice models combined with RAP Meter technology (described at a later point in this document) to verify success and adjust parameters based on real time feedback. The key difference between voice models presently used and a Super Voice Model is: Current voice models attempt to adapt to the many different speakers, while a Super Voice Model attempts to adapt the speaker to fit a standard voice model (the Super Voice Model).

Figure 17:
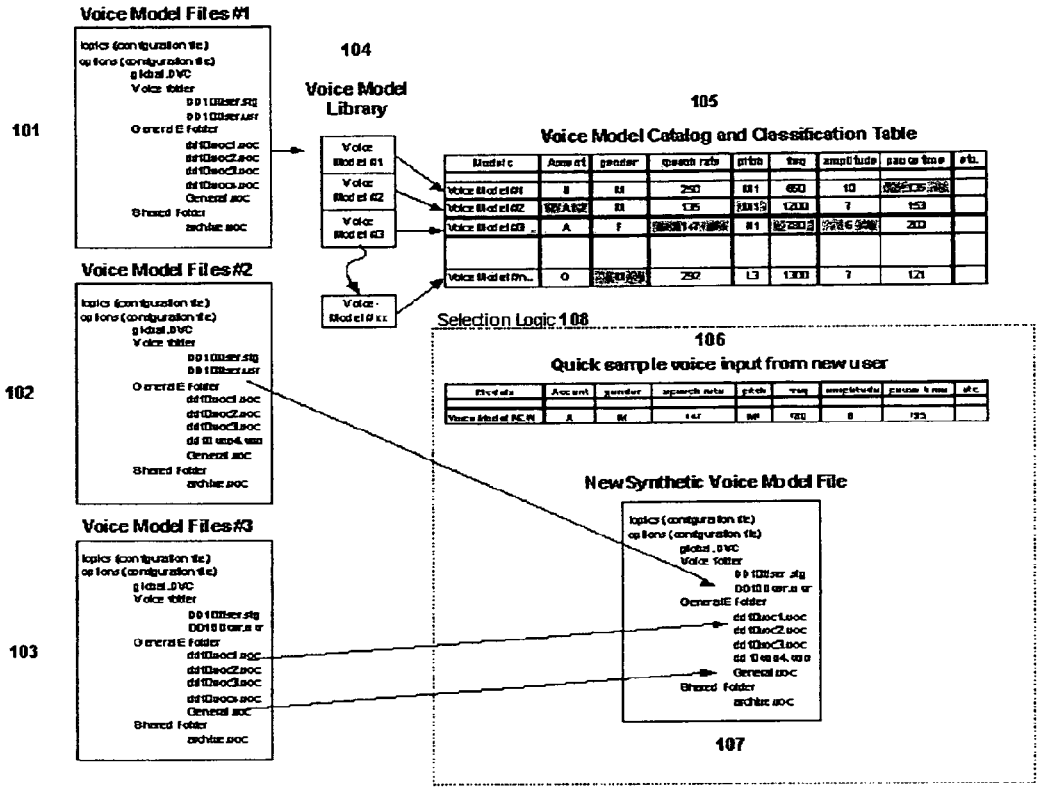
FIG. 17 illustrates the major components and overview process for a Super Voice Model (SVM).

Referring to FIG. 17, given that Voice Models will be available for transfer using VMM, they can be collected into a Voice Model Library (FIG. 17 #104). By having a collection of voice models available for analysis and classification, a new type of synthetic voice model can be created (FIG. 17 #107), derived from the parameters available in the collection (FIG. 17 #105). In general, the Super Voice Model involves a quick sample of voice input from a new user (FIG. 17 #106) and a comparison of the available parameters in the parameter lookup table (FIG. 17 #105) and a selection of the specific parameters from the voice recognition voice model files (FIG. 17 #101, 102, 103) with the final output result a synthetic Voice Model (FIG. 17 #107) to recognize the person speaking at the time without that person previously training the LVVR system. The new Voice Model can optionally be calculated real time or prior for a given person via some quick recording. The SVM is based upon having information about Voice Models readily available, organized, and ready to statistically calculate to create a synthesize Voice Model that can be used for any given speaker at the time. The overview process flow is as follow; VMM creates and archives voice models into a Voice Model Library (FIG. 17 #104), the voice models are collected and categorized by common attributes of speakers, analysis' is implemented with results deposited into a table (FIG. 17 #105) indicating availability of parameters for a potential synthetic generic voice model. As more voice models are added, potentially new generic voice models can be created. A Super Voice Model includes the library of voice models (FIG. 17 #104), the lookup table of voice models indexed by parameters (FIG. 17 #105), the logic to select a specific voice model from the table (FIG. 17 #108), and the ability to install the synthetic voice model into a voice recognition dictation system using VMM technology and a measurement of the success of the synthetic voice model using RAP Meter technology. A possible enhancement to the Super Voice Model database selection rules could include algorithms similar or as described in U.S. Pat. No. 6,029,195 Herz (System for Customized Electronic Identification of Desirable Objects).

In summary, the "Super Voice Model" eliminates the need for specific user training or enrolling into a voice recognition system. The Super Voice Model is a classification and cataloging of many user voice models based on a library of known unique user files (Speaker Voice Models) classified by characteristics of each unique speaker including gender, rate of speech, and phoneme characteristics (e.g. spectral characteristics, pitch, frequency, and amplitude) and the use or combining of these files to statistically create a speaker voice model that previously did not exist or possibly the ability to use a speaker voice model that is very similar if one does exist.

As we look toward the future, computer voice recognition is moving toward noise recognition using one of many methods (e.g. training, pre-programming, learned through the experience of artificial intelligence or expert systems). If this technology is applied to the analysis of plane crashes, as an example, it could help to an understanding failures leading back to root causes. For example, building voice models of mechanical failure from previous audio recordings of mechanical malfunctions, during real time flights, sounds can be analyzed and warnings issues based on noises outside of the typical flight background noise.

It is yet another object of this invention to describe a methodology for measuring voice recognition accuracy and performance in combining them into a single metric to provide a reference point indicating voice recognition system reliability. Using multiple systems and transferring voice models can result in a degradation of system performance and text output accuracy. As a result indicators are needed to accurately measure accuracy as a correct word input count and performance as system responsiveness. These two key measurements performing reliably are what people expect from a quality voice recognition system. These metrics are defined here as Reliable Accuracy Performance Rate or "RAP Rate". When using multiple voice recognition systems, the expectation is to achieve comparison RAP Rates between systems. To accomplish a consistent RAP Rate an accurate measure must first be referenced. Then, based on the RAP metrics, decisions can be made as to the adequacy. If improvement is needed then, logical decisions can be made as to what changes affect RAP Rate.

Reliable Accuracy Performance Rate (RAP Rate) is defined in this invention as spoken audio correctly translated to text delivered with measured delay time from word spoken to word visible text in an electronic document. Components that affect RAP Rate include hardware components, software components, and a person or "user". From this, the following can be stated: Reliable Accuracy Performance Rate=User (u)+System(s)+Quality of components (q)+Integration (I) or RAP Rate=u+s+q+I. Where, a user "u" is defined as the person speaking to a voice recognition system. The system "s" is defined as a system trained to recognize a person's voice for the purposes of identifying audible spoken words. Quality of components "q" is defined as the hardware and software component functionality that is appropriate for voice recognition dictation applications and Integration as "I" defined as how the components are combined together including the merging of hardware, software, and parameters focusing on providing optimal voice recognition. For example, if a system has a reliable accuracy of 96% and a reliable performance of 1 second, then the RAP Rate would equal 96% at 1 second or a RAP Rate of 96/1. Presently, a large vocabulary voice recognition dictation system including quality components and good integration can deliver a RAP rate of approximately 96% at 4 seconds (96/4). The RAP Rate equation components can be further defined:

Quality "q" Defined as compatibility of components and functionality that are well-matched for LVVR=CPU margin %/(% of app in memory/(% of app in memory−(KB Cache/cache hit rate)/60)−(A/D conversion time+bus throughput latency). As an example, this equation indicates aspects of hardware that can be changed to achieve an improved RAP rate focusing on the metric of Performance indicating system responsiveness to the process of voice recognition. The performance result is measured in time (seconds for current technology). The "delay" in the performance definition will never be zero. It may not be immediately perceivable to a user; but it can be measured and over periods of time will be perceived by the user.

Integration "I", defined as combining the components into a system environment to be used for voice recognition dictation where; I=System parameters+Application parameters incompatibilities−Other task executed−Throughput resistance. The integration aspect of RAP Rate affects reliable accuracy. System parameters include hardware (microphones, sound port, AD conversion devices, DSP methods, etc. and the related software driver modules, firmware, bios, operating systems, applications/utilities and their specific parameters). Computer parameters designed to accomplish general computing (i.e. word processing, multimedia, games, etc.) can contain parameters that are in conflict with a specific goal such as LVVR. Setting up software parameters to ensure the capabilities for LVVR are enabled at all levels can improve RAP Rate. As a result, "Integration" ties directly to RAP Rate.

To measure the specific metrics of accuracy and performance a RAP Meter software application is created. A person skilled in the art of computer hardware and software development will realize that other methods of creating a device to measure accuracy and performance for voice recognition are possible including a separate device using a separate hardware and software. The RAP Meter is one example used here to further describe the concept. Referencing FIGS. 6 through 10, an explanation of the RAP meter software is as follows:

FIG. 6 represents the opening screen of the RAP Meter software. This screen contains 6 user control buttons and quick instructions in a display area of how to use the RAP Meter. The voice recognition software is launched and running in the background. The 6 control buttons include: 1) Verifying RAP, 2) Log filed, 3) Help button, 4) Selected mic, 5) Certificate, and 6) Exit button.

Figure 8:
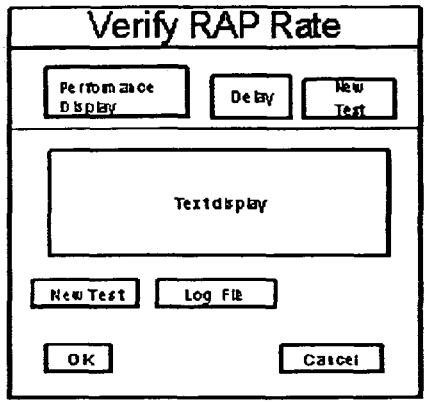
FIG. 8 is the RAP Rate user interface where the testing is implemented. It contains three display areas and two "New Test" buttons that start either the accuracy or the performance test. The "Delay" display illustrates the response time of how long it takes the speech recognition software to translate an audio spoken word into text display on a computer screen. The "Text" of display area provides the text to be read during the RAP Rate testing. The "Performance" display area provides the text to be read for the performance test. The "Log File" displays a log file of the current test. The "OK" button reverts back to the RAP Meter main screen, and "Cancel Button" reverts back to the main screen.

To operate the RAP Meter a user selects the verify RAP button. A new session screen is displayed as seen in FIG. 7. The user inputs specific information about the test that is about to occur including a name for the test session, what kind of microphone is being used, and what is the voice recognition application software. The use also selects a sound port from the available sound ports displayed. After entering this information and clicking the "OK" button, another screen to implement the actual test will be displayed as shown in FIG. 8. Referring to FIG. 8 there are two separate areas of the screen that, contain controls. The top area of the display operates the performance test in the low area of the display operates the accuracy test.

To perform a new performance test the user clicks the top new test button. This will cause words to be automatically displayed in the performance display area. As the words are displayed the user is to speak the words as they appear. The time is measured from the time the word is spoken until the point in time when the word would be displayed on a computer screen. This measured delay time is displayed for each word in the delay window. When the performance test is completed the word delays are averaged and written into a log file or wrap or a certificate. For performance, the RAP Meter records the time that sound was input (Tstart) and subtract from the time that text is displayed (Tend) on the screen for editing in a text application. Thus, Performance=Tend−Tstart.

To perform a new accuracy test the user clicks the new test button on the lower half of the RAP Meter display. In the text display area a paragraph is printed out for the user to read. As the user reads the text, the RAP Meter counts the words that are translated correctly versus the words that are translated incorrectly. It calculates the ratio of these two values in displays the results as a percentage of correct words in a log file and RAP Rate certificate. As a person reads the text the words are translated into text. The RAP Meter compares the original text with the text that was translated using the LVVR system and responds back to the user with an accuracy measurement in percentage of correct translated words (e.g. 96% correct). Thus, Accuracy %=words incorrect/words correct. Incorrect words can be highlighted for display to the user.

To view and use the results of the performance and accuracy test the user can select the log file button. A log file will be display as shown in FIG. 10 indicating the results of the performance in the accuracy test in combining the metrics to create a RAP Rate of accuracy percentage versus performance as system response time. The log file includes specific details on system specifics including voice recognition application, computer hardware (processor type, memory capacity, CPU speed, etc.). The log also includes words that were spoken during the performance test and an indication if the words were correctly translated along with the delay for each word spoken measured in seconds or fractions thereof. The log file also includes output of the accuracy test including the paragraph that was read as displayed on the screen and the paragraph that was spoken by the user of the test (input and output text). The accuracy metric is also included in the log file as a percentage of correct words versus and correct words. The log file can be printed, sent to the mail, or transferred by other means.

Figure 9:
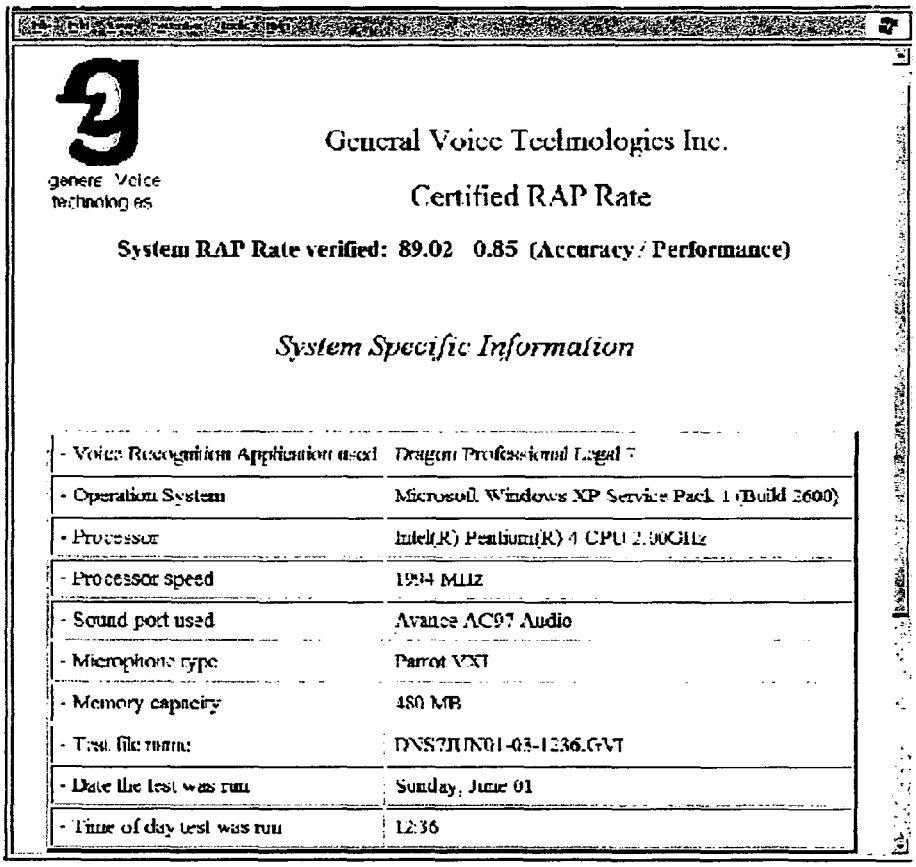
FIG. 9 is a display of the RAP Rate Certificate. The RAP Rate certificate is provided by the RAP Meter after the RAP Rate test has been completed, used for sharing and displaying the RAP Rate achievement for a specific system.

Referring back to FIG. 6, there is a "Certificate" button. Clicking this button will display a RAP Rate certificate of the current or previous sessions as shown in FIG. 9. Again, referring back to FIG. 6 if the user clicks the "Select mic" button, another screen is displayed showing the microphones available on the system to be used and a VU Meter for a quick check to ensure the microphone is working correctly. Clicking the help button displays a help file on RAP meter features and use.

The RAP Rate Meter concept is an extend feature for verification of the Voice Model Mobility concept providing an indication of successful operation of moving a voice model. The RAP meter can also be provided as a separate application for certification of LVVR applications. As an example, companies could use RAP Rate to advertise displaying RAP certification and could be charged a per-system usage fee or license fee as a way to create revenues from RAP licensing.

The components (Application Programmers Interfaces) used to get real time capture and performance measurement includes; software application handles to indicate applications loaded are used for LVVR. Audio input device IRQ and I/O address range and software driver IO function calls to indicate when the A/D translation has started. Speech recognition function calls (e.g. RealTimeGet and TimeOutGet) to indicate when the voice recognition engine has started and completed the translation. Video board IRQ and I/O address range and software driver 10 function calls to determine when the text is being displayed to the editor on the screen. As words are spoken into a microphone, trigger points are set to indicate when each section of the text translation and display process has completed its task. The following steps indicate one method regarding how RAP meters can function as an example:

1. (Setup) Application used for LVVR is identified
2. (Tstart) A/D time is measured by logging the time the driver gets sound input. This can be accomplished through a peek message or for MSWindows; InmChannelAudio::IsIncoming, HRESULT IsIncoming(void); or other method.
3. (Pstart) Determine and log the when the speech processing engine has received the sound by using a function call (i.e. RealTimeGet).
4. (Pend) Determine and log the time when the speech engine has completed the translation using a function call (i.e. TimeOutGet).
5. (Tend) Determine when the graphics driver has displayed the text using a peek message or for MSWindows a function call (i.e. UI Text Event; TEXT_VALUE_CHANGED).
6. (Report) Calculate the times. For general performance Tend−Tstart will supply the performance delay. For further resolution to determine areas of throughput resistance, steps 2 and 3 can be used.

This is one method of achieving the desired goal of measuring RAP Rate; however one skilled in the art of software programming or similar computer skills sets can realize other methods of achieving the same results. This method used as an example is not intended to be the only possible method and it is recognized that many alternative methods are possible.

In accordance with the features previously described in this invention the RAP meter can be applied to engineering and manufacturing processes. It is the object of this invention to describe a methodology for a process that measures specific hardware and software features necessary to support optimal Large Vocabulary Voice Recognition (LVVR) using Reliable Accuracy Performance (RAP) Rate as the measurement reference of the processes. during engineering the reference measurement values are inserted into process sheets allowing controlled steps to be followed. Using this technique processes can be developed for a production line for LVVR system manufacture. For development the methods include a hardware components selection process based on investigation of functions needed, a test process to measure components adequacy, and documenting functionality and parameters.

Figure 14:
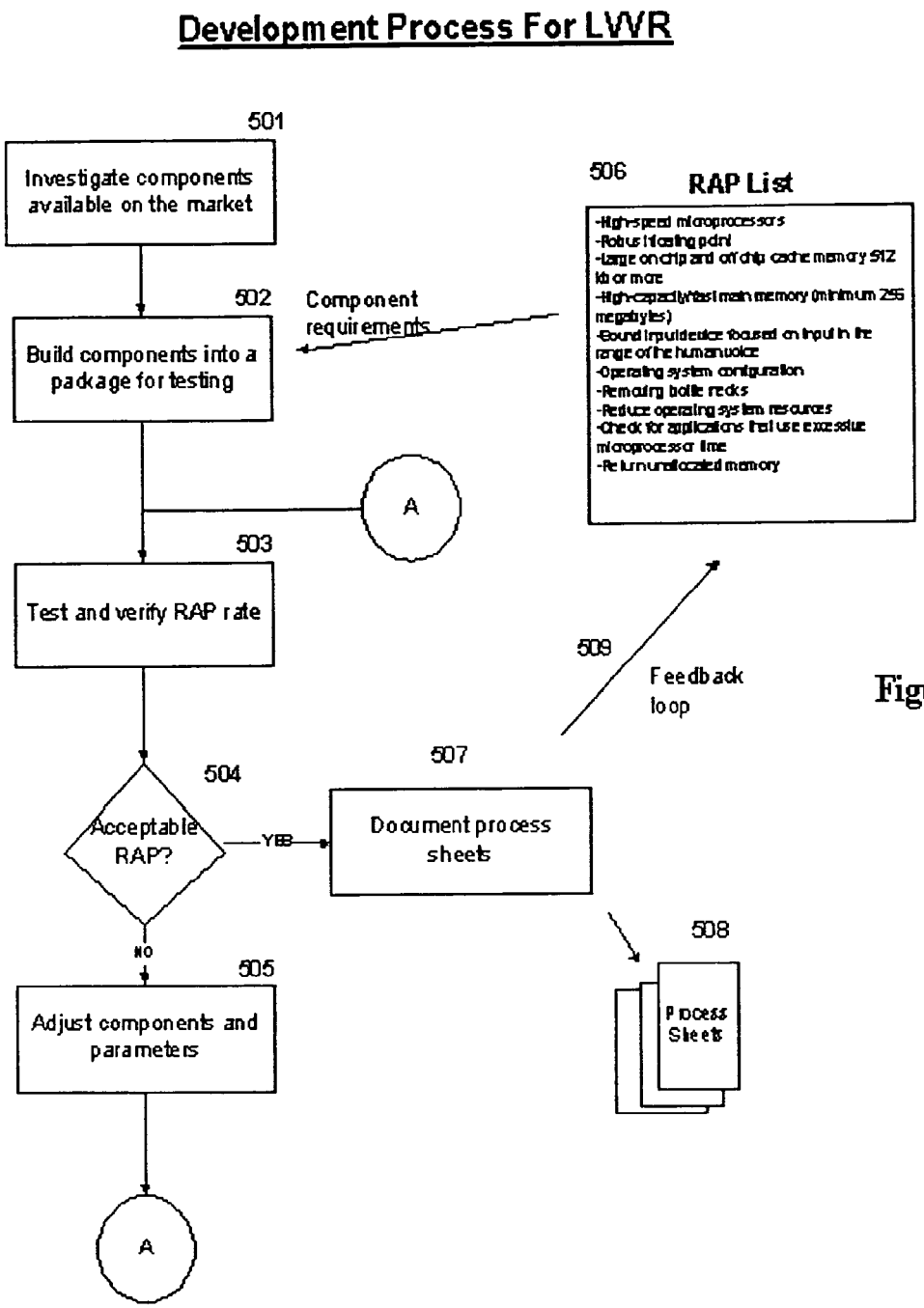
FIGS. 14 and 15 illustrate a flow chat of a manufacturing process using the RAP Rate metrics to produce voice recognition systems with an observed and predictable level of accuracy and responsiveness.

Referring to FIG. 14 for reference, the engineering development process is described. FIG. 14, #501 starts the process with a component investigation of optimal components to be used in voice recognition dictation systems. Supplier components are investigated for the specific hardware functionality needed (FIG. 14, #502). Specifications and documentation distributed by component suppliers is investigated for the specific fit to the RAP list of requirements FIG. 14, #506. The process can include having the suppliers of hardware components produce the list of hardware that meets the requirements of the RAP list. At present the following is a list as an example of optimal features for voice recognition dictation systems:

Optimal features to enhance RAP Rate

High-speed microprocessors

Robust floating point features

Large on chip and off chip cache memory 512 kb or more

High-capacity/fast main memory (optimal 512 megabytes)

Sound input device with performance focused on input in the range of the human voice An operating system specifically configured (tuned) for the application of voice recognition including:

Removing any throughput resistance including processes that require main CPU clock cycles but don't provide advantage to LVVR.

Removing operating system resources that use main memory or run in the background like schedulers, virus checking, or utilities that execute polling at specific time intervals or triggers.

Removing applications that use main CPU floating point and moving that work to other microprocessors.

Ensuring that any operating system or applications being used return allocated memory back to being available and not left locked out by the LVVR application.

These specific features are typically not included recommendations with the "off the shelf" hardware and software. Voice recognition application packages from vendors like IBM, Dragon, or L&H will not mentioned all the details as part of the software requirements. These features are dedicated to the task of voice recognition and can be packaged as such to create a large vocabulary voice recognition appliance. Originally, to measure and characterize the hardware for large vocabulary voice recognition experimentation, tools and indicators that were readily available in the industry and part of the operating systems were used. Using these tools measurements could be acquired and a determination was made as to hardware resources needed. Then a manual process of measurement was used in effort to refine what further hardware and software parameters would be best. From this work an automated test methodology was built to allow production mode for development and manufacturing to be put in place to characterize the hardware faster. The automated test methodology is using the RAP Meter technology. FIG. 14, #503 illustrates the RAP Meter test and verification being applied to the engineering development process. If an acceptable RAP Rate is achieved the documented process sheets will be delivered to the manufacturing process as illustrated in FIG. 14, #508, otherwise adjustments to components and/or parameters are made FIG. 14, #505 in the system goes back to test FIG. 14, #503. An example engineering process sheet for system BIOS is shown in FIG. 16.

Figure 15:
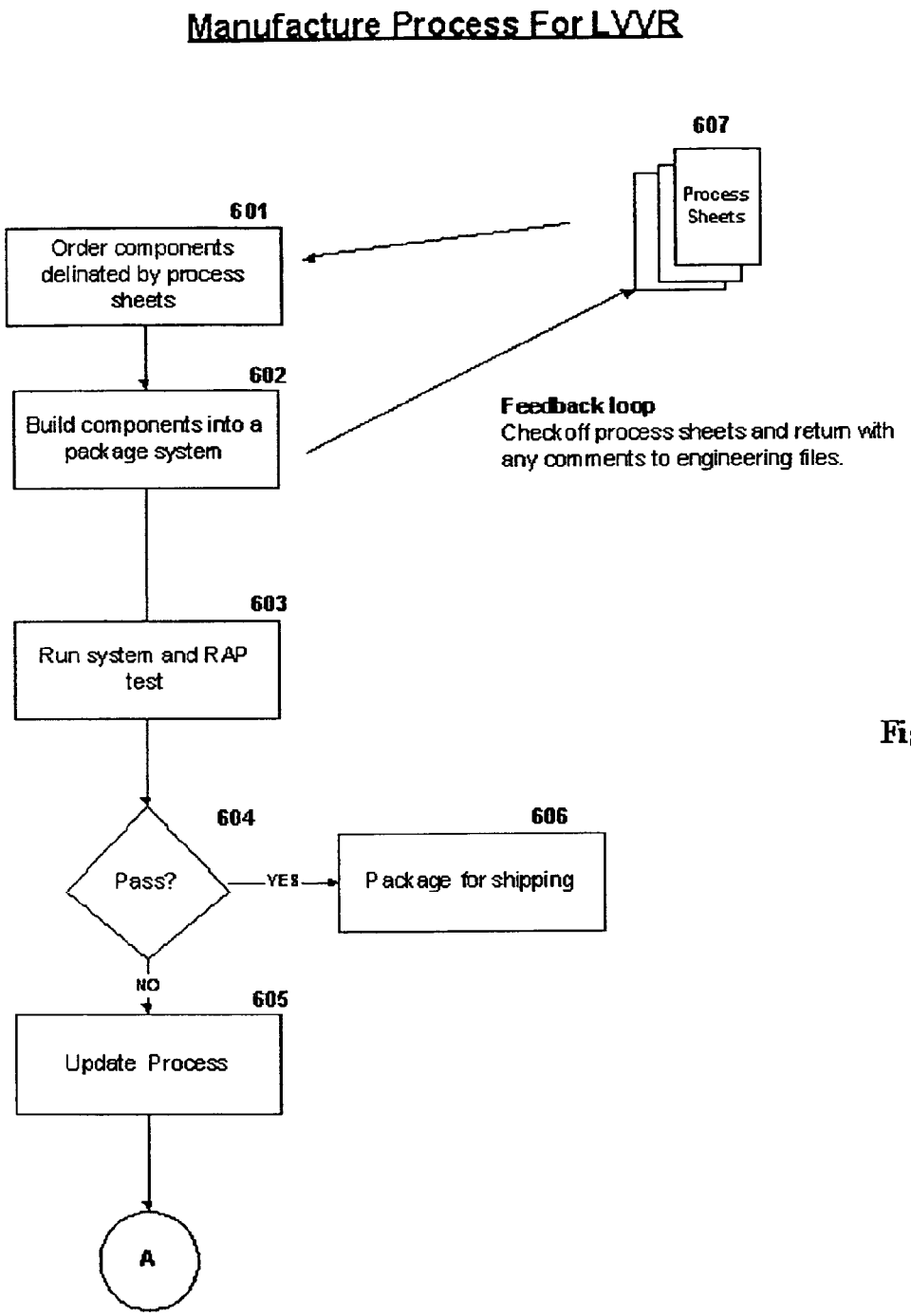

Referencing FIG. 15, a description of the manufacturing processes provided. Manufacturing process sheets (FIG. 15, #607) are provided from the engineering process in FIG. 14. The components are ordered (FIG. 15, #601) as described by the engineering process sheets. The components are integrated into a system package (FIG. 15, #602) and then tested using the RAP Rate technology (FIG. 15, #603). If the RAP Meter test indicates successful results, the system is packaged for shipping (FIG. 15, #606) otherwise the processes updated (FIG. 15, #605) to avoid unsuccessful results in the future.

These processes were developed around the concept of achieving a standardized level of Reliable Accuracy and Performance Rate (RAP Rate). The components and functionality needed to achieving an adequate RAP Rate are listed and explained below as an example and expected to change over time. However, as the components and technology continue to improve, the standard measurement of RAP rate will remain a valid measurement allowing users to understand what is being purchased or provided. In other words RAP Rate is to voice recognition what wattage or power measurement is to the electric industry.

Description of the features in additional detail: A RAP rate of 100/0 defined as 100% accuracy with zero delay time measure from time of spoken word to displayed text in an application is the ultimate goal. It was determined from research and testing that specific components can affect RAP rate. Additionally where some component may be lacking, another may be more than adequate resulting in a similar RAP rate. As described earlier as part of this invention, RAP Rate=u+s+q+I. The following list explains items that are important with regards to these metrics and list some industry standard methods of measurement. When RAP rate is not acceptable the other methods can be used to isolate the problem areas. High-speed microprocessor; presently Microprocessor speeds today are up to 800 MHz+ on average and steadily moving to higher processor speeds. When measuring microprocessor usage while using LVVR applications, results show that microprocessor usage is at 100%. To determine this, a combination of a manual process and an automated process is used. One method of measuring CPU usage is by using the performance monitor tools available with an operating system like Microsoft Windows 98. The goal is to achieve a margin of microprocessor resources left available while dictation to a system is being done. Ideally, with voice recognition a performance in the range of no noticeable delay from the time the words are spoken to the time the text is displayed in a text editor is a desired metric. If other applications are to be run simultaneously, then an additional margin in performance must be added to avoid affecting RAP rate.

Robust floating point features; a robust floating-point microprocessor is needed due to the intensity of math calculations that are routine for voice recognition applications. Floating point microprocessors may be embedded in a main microprocessor or done separately by the main CPU instruction set or software. Microprocessors that support floating-point in different ways can directly affect RAP rate. Ideally a microprocessor that has a combination of hardware registers, floating point instruction set with features that allow multiple calculations with minimal clock cycles, while supporting access to fast cache memory are desirable. Measurements on floating points can be achieved using industry standard tools or published results in the trade magazines or from the manufacturers.

Large on chip and off chip cache memory; Cache memory is the closest storage medium to the microprocessors doing the work. Typically the memory closest to the main CPU will be the fastest data access. The capacity of the cache memory, the percentage of cache hits, and if the cache is embedded in the CPU chip or off chip will make a difference. "KB Cache/cache hit rate" work as performance enhancement in the equation and can be measured using embedded OS performance tools of Microsoft Windows.

High-capacity/fast main memory; a large capacity main memory is desired and will affect performance. Enough capacity to allow the LVVR and related applications to execute directly out of memory yields the best performance. Having to go out to disk is a magnitude of time longer and should be avoided whenever possible. Testing and measuring results indicate that using a LVVR system can easily use 256 megabytes to prevent disk access. This can be measured using operating system tools like the performance monitor of Microsoft Windows 98, along with other tools available in the computer industry. As memory is reduced a delay resulting in a lower RAP rate will occur. Therefore the equation includes a metric "% of application in memory" as add or minus to performance. These values will change over time and technology, but the goal remains the same for LVVR, to execute without disk access.

Sound input device with performance focused in the range of the human voice. Most sound components for PC's focus on output while input is a secondary consideration. Therefore sound input components can cause performance problems. The physical system interface/bus can also add or subtract to performance. A/D conversion time+bus throughput latency time subtracts from the performance and can never be removed from the system. While this delay can be lowered to the level of not perceivable, it will never be reduced to zero. Oscilloscopes are one method of measuring this delay. This measurement is also included in the performance measurement of RAP Rate which can be measured through a software tool like a RAP meter.

When the objective of Quality is completed, then integration of the component parameters and reduction in bottle necks are the objective. The integration aspect of RAP rate can be affected by software (firmware, operating systems, applications/utilities and parameters). Parameters can enhance or subtract RAP rate from a large vocabulary voice recognition application. As an example, a word processing application with a parameter set to auto correct grammar during dictation may cause sever RAP rate reduction due to resources being shared for real time grammar correction and LVVR. Starting at the lowest level (BIOS) and working through the OS towards the LVVR application is one method of tuning software for a good RAP rate. Another method would be to reverse the order and start at the LVVR application and work back. Then create a software utility that does the parameter settings automatically based on the known information. Therefore an explanation of the equation above would be to add items that can be modified to enhance LVVR and to subtract items that cannot be removed and must be worked around like incompatibilities. There are not industry standard tools to measure specifically for types of parameters that affect RAP Rate. At this point RAP Rate or an individual component of RAP is the only measurement that sums these conclusions specifically voice recognition dictation systems..

It is the object of this invention to describe a methodology for developing a handheld transcriber with full features to execute voice recognition software like Dragon naturally speaking internal to the hand held transcriber. Using the RAP Rate engineering process, a handheld transcriber with voice recognition software internal to the transcriber was developed. In accordance with this invention and the uses for the RAP Meter and Voice Model Mobility technology, it is the object to describe a methodology to an improvement of the present handheld transcriber technology used for voice recognition dictation.

One object of this invention is to describe a method that can reduced voice recognition system training time by using a cable that allows a microphone to be connected to both the handheld transcriber and a desktop PC and implementing a process of synchronization for training large vocabulary voice recognition on both devices simultaneously. Referring to FIG. 11, a Y cable configuration connects to the handheld transcriber microphone input and at the same time connects to the computer for the voice recognition software input. This configuration creates a single microphone input for both devices (the computer and the handheld transcriber). Using this method enables a single training session for both devices. This was successful allowing a user to train a hand held transcriber at the same time the desktop system was trained. This method saved the redundant training time but did not solve the other problems of display for direct user feedback and the ability to correct accuracy errors during the dictation process. This training once for two devices has advantages over the method described in U.S. Pat. No. 6,477,493 Brooks Et Al. (Offsite Voice Enrollment on a Transcription Device for Speech Recognition) where it is described how to train a handheld transcription device using a cable connected to a voice recognition system. Using Brooks et al. system requires training once for the transcription device and a second time for the desktop voice recognition system.

A better method of accomplishing large vocabulary voice recognition for handheld transcribers would be to package the desktop system hardware into a handheld form factor.

It is further the object of this invention to describe a methodology of building a handheld device containing enough CPU power, memory, storage, display, input sound system, and supporting operating system and voice recognition software Inc. into the handheld device to accomplish voice recognition dictation with the handheld device.

Figure 12:
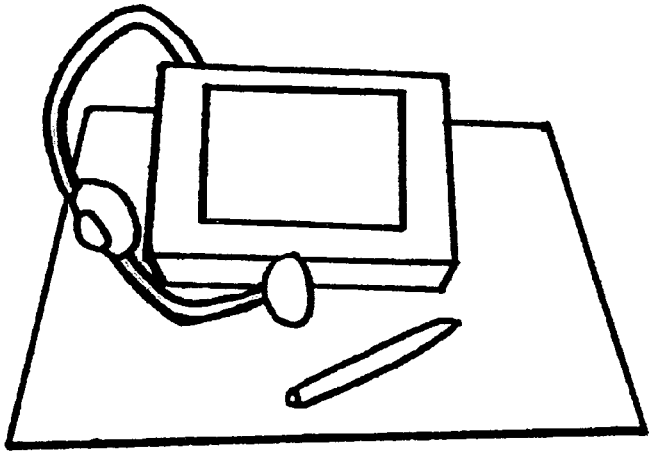
FIG. 12 is a prototype handheld computer with voice recognition software included for the purposes of voice dictation.

From previous work it was discovered that computer hardware to support fully functional large vocabulary voice recognition for handheld transcribers and these types of applications must include at least the following components to be effective: High-speed microprocessor with robust floating point feature, large on chip and off chip cache, high-capacity/fast main memory, quality sound input device with performance focused in the range of the human voice or signal to be translated, and an operating system specifically configured (tuned) for the application of voice recognition. Components were found, combined, tested, and packaged in a small form factor. These smaller components allowed a prototype to be built in 1999 to prove the viability of such a device. Referring to FIG. 12 is a graphic a prototype large vocabulary dictation handheld transcriber using Microsoft Windows 98 and Dragon Professional Voice Dictation application as an example. Other operating systems and applications could have been used like Linux and a public domain voice recognition application. This device solved the problems listed above. The prototype is a fully functioning handheld transcriber focusing on proof of the concepts of form factor, use of VMM via a network drive, the ability to provide direct feedback of speech to text while dictating in the handheld environment, and the ability to use a voice recognition interface combined with touch screen for user control. The prototype supports a vocabulary of over 30,000 words. Test results from this proto-type indicate that production models could support large vocabularies including libraries to support medical and legal services. This prototype includes battery operation, network connection, USB, keyboard and mouse if desired, and connection for 120 volt AC power, and a microphone input jack.

Figure 13:
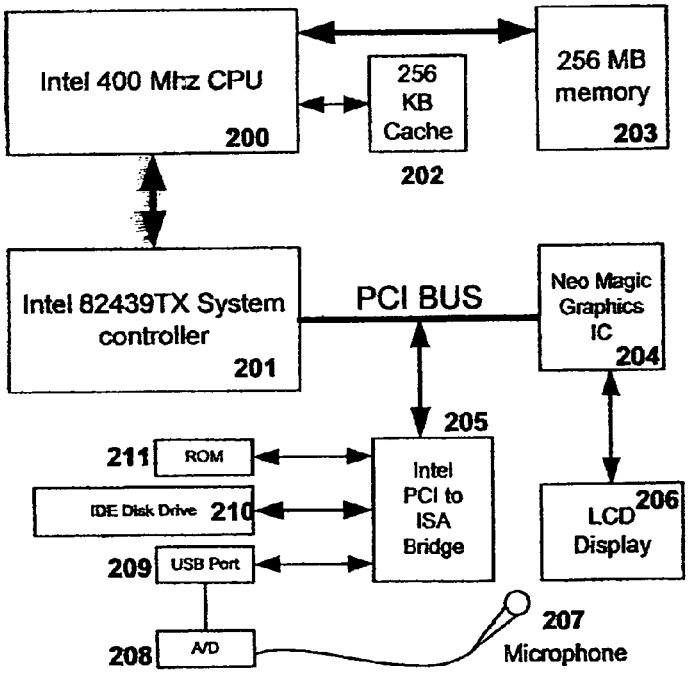
FIG. 13 illustrates computer hardware and the relationship of the components. The components that are shown fit into the form factor of a handheld transcriber.

Referring to FIG. 13 is a block diagram of the handheld transcriber components. They include a 400 MHz CPU (FIG. 12, #200), 256 KB cache (FIG. 12, #201), 256 MB of memory (FIG. 12, #203), and Neo Magic graphic chip (FIG. 12, #204), a PCI to ISA bridge (FIG. 12, #205), and a USB port (FIG. 12, #209). These components are integrated into any Plug n Run motherboard/daughter board configuration purchased from Cell Computing, located in California. The A/D converter (FIG. 12, #208) was purchased from Telex in the microphone (FIG. 12, #207) was purchased from Radio Shack. The color LCD (FIG. 12, #206) was purchased from Sharp.

The Microsoft Windows 98 operating system was loaded onto the IDE disk drive in the voice recognition software (Dragon Naturally Speaking) was installed onto the handheld transcriber.

After applying power to the device it can be controlled using voice recognition commands and touch screen. When the device becomes ready it automatically is in a mode to select a user and dictation can start. Dictating to machine; the device supports a microphone input jack with a microphone on/off switch that can be momentary or left in either mode. The user speaks into a microphone and the voice is translated into a text editor on a handheld screen. What makes this handheld device unique is the amount of words (large vocabulary of greater than 30,000+ words) that can be translated realtime during dictation. Save file saves the dictated text files for later editing, importing and exporting, archival or transfer. The device supports a network connection for moving the files and voice models to and from the handheld device.

When Windows 98 boots the startup configuration launches Dragon voice recognition software with a Dragon pad work process and turns the microphone on. The user is then able to use voice commands to navigate the Windows operating system and the Dragon software and also dictate to the Dragon pad work processor. The RAP Meter technology was used for selection in verification of components to achieve the desired goal of handheld voice recognition dictation. Voice model mobility was used to maintain an up-to-date voice model between the handheld device in the desktop voice recognition system. This is one example of a handheld transcriber using components to support the voice recognition software internal to the handheld transcriber. It is to be appreciated that other components could be used to achieve the same results.

What is claimed is:

1. A computer software application that functions upon a first computer that uses a speech recognition computer program, into which program a first user is enrolled and which program has produced the first user's user voice model files and the first user's enrollment entries, thereby allowing the first user access to the program and increasing the accuracy of the said program, the said application comprising:

a. a recording means adapted to record the first user's voice model files and enrollment entries, stored on the memory of the first computer, and store the first user's voice model files and enrollment entries in recoverable form as the first user's stored enrollment entries, b. a transfer means adapted to move the first user's user voice model files and the first user's stored enrollment entries to a computer file storage device, and c. an enrollment means adapted to enroll the first user on another computer other than the first computer, said another computer having a speech recognition computer program installed on it, using the first user's stored enrollment entries and the first user's user voice model files from the computer file storage device, to thereby allow the first user to have access to and increase the accuracy of the speech recognition computer program installed on the said another computer.

2. A software application as recited in claim 1 that includes an identification means that can identify that speech recognition computer program installed on a computer.

3. A software application as recited in claim 1 that can identify users that are enrolled in the speech recognition computer program installed on a computer.

4. A software application as recited in claim 1 that can copy speech recognition training files, system registry parameters, vocabularies, and macros, and package them as a "Voice Model" separately from the speech recognition computer program.

5. A software application as recited in claim 1 that can automatically or manually move a Voice Model to another system or physical location.

6. A software application as recited in claim 1 that can move, install, and enroll a Voice Model including all the specific user parameters, files, and vocabularies from the said first computer to the said another computer.

7. A software application as recited in claim 1 that obviates the need for training the speech recognition program on the said another computer.

8. A computer software application that functions upon a first computer that uses a speech recognition computer program, into which program a first user is enrolled and which program has produced a first user's user voice model files and a first user's enrollment entries, said application comprising:

a. a recording means adapted to record the first user's voice model files and enrollment entries, stored on the first computer, and store the first user's enrollment entries in recoverable form as the first user's voice model files and enrollment entries, b. a transfer means adapted to move the first user's user voice model files and the first user's stored enrollment entries to a second computer having a speech recognition computer program installed on it, and c. an enrollment means adapted to enroll the first user on said second computer, using the first user's stored enrollment entries and the first user's user voice model files transferred from the first computer.

9. A software application as recited in claim 8 that includes an identification means that can identify that speech computer recognition program installed on a computer.

10. A software application as recited in claim 8 that can identify users that are enrolled in the speech recognition computer program installed on a computer.

11. A software application as recited in claim 8 that can copy speech recognition training files, system registry parameters, vocabularies, and macros, and package them as a "Voice Model" separately from the speech recognition program.

12. A software application as recited in claim 8 that can automatically or manually move a Voice Model to another system or physical location.

13. A software application as recited in claim 8 that can move, install, and enroll a Voice Model including all the specific user parameters, files, and vocabularies from the said first computer to the said another computer.

14. A software application as recited in claim 8 that obviates the need for training the speech recognition computer program on the said another computer.

15. A computer software application that functions upon a first computer that uses a speech recognition computer program, into which program a first user is enrolled and which program has produced a first user's user voice model files and a first user's enrollment entries, said application comprising:

a. a recording means adapted to record the first user's voice models and enrollment entries, stored on the first computer, and store the first user's enrollment entries in recoverable form as the first user's stored voice model and enrollment entries, b. a transfer means adapted to move the first user's user voice model files and the first user's stored enrollment entries to a computer file storage device, and to move the first user's user voice model files and the first user's stored enrollment entries from the computer file storage device to another computer other than the first computer, said another computer having a speech recognition computer program installed on it, and c. an enrollment means adapted to enroll the first user on the said another computer, using the first user's stored enrollment entries and the first user's user voice model files from the computer file storage device.

16. A software application as recited in claim 15 that includes an identification means that can identify that speech recognition computer program installed on a computer.

17. A software application as recited in claim 15 that can identify users that are enrolled in the speech recognition computer program installed on a computer.

18. A software application as recited in claim 15 that can copy speech recognition training files, system registry parameters, vocabularies, and macros, and package them as a "Voice Model" separately from the speech recognition computer program.

19. A software application as recited in claim 15 that can automatically or manually move a Voice Model to another system or physical location.

20. A software application as recited in claim 15 that can move, install, and enroll a Voice Model including all the specific user parameters, files, and vocabularies from the said first computer to the said another computer.

21. A software application as recited in claim 15 that obviates the need for training the speech recognition computer program on the said another computer.

22. A method for training a second speech recognition computer, so that the second speech recognition computer is more effective at speech recognition than it was prior to the training, comprising the steps of:

a) training a first speech recognition computer by causing the said first speech recognition computer to form first voice model files that contain the training result, and thereby to cause the first speech recognition computer to be more effective at speech recognition, b) making the said first voice model files accessible to a second speech recognition computer, that is adapted to use the said first voice model files to enhance the effectiveness of the said second speech recognition computer at speech recognition, and c) causing the second speech recognition computer to use the said first voice model files to enhance the effectiveness of said second speech recognition computer at speech recognition.

23. A speech recognition computer system, comprising:

a) a first computer including a memory, said memory containing a first installation of a speech recognition program, and said memory also containing first voice model files that are adapted to be used by the said speech recognition program to increase the accuracy of the said speech recognition program when the said first computer is used by a user to convert the speech of the user into text, said speech recognition program also containing a training module adapted to convert generic voice model files to the first voice model files by monitoring the conversion of the speech of the user into text, b) a second computer including a memory, said memory containing a second installation of the speech recognition program, and c) a transfer device adapted to copy the first voice model files from the first computer to the second computer in such a way that the first voice model files can be utilized by the second installation of the speech recognition program to increase the accuracy of the second installation of the speech recognition program when the said second installation of the speech recognition program is used by the user.

*24. A system for enrolling users in a speech recognition computer program to increase the accuracy of the program, the system comprising:*

*a. a source computer comprising:*

*i. memory including a source installation of a speech recognition computer program into which a user is enrolled and which has generated and stored voice model files and enrollment entries associated with the user;*

*ii. a processor adapted to:*

*record the user's voice model files and enrollment entries, stored on the source computer,*

*store the user's enrollment entries in recoverable form as the user's voice model files and enrollment entries, and*

*transfer the user's voice model files and the user's enrollment entries to a second computer having a speech recognition computer program installed on it, and*

*b. a second computer comprising:*

*i. a memory including a second installation of the speech recognition computer program; and*

*ii. a processor adapted to enroll the user in the speech recognition computer program on said second computer, using the user's voice model files and stored enrollment entries that were transferred from the source computer,*

*wherein the enrollment of the user on the second computer enables the user to have access to the speech recognition computer program on the second computer and increases the accuracy of the speech recognition computer program on the second computer.*

*25. A system as recited in claim 24, wherein the processor of the second computer is adapted to identify the speech recognition program that was on the source computer.*

*26. A system as recited in claim 24, wherein the processor of the second computer is adapted to identify the users that have previously been enrolled.*

*27. A system as recited in claim 24, wherein the processor of the source computer is adapted to copy speech recognition training files selected from the group consisting of system registry parameters, vocabularies, and macros, and package them as a "Voice Model" separately from the speech recognition program.*

*28. A system as recited in claim 24, wherein the processor of the second computer is adapted to install a Voice Model received from the source computer, the Voice Model, including user parameters, files, and vocabularies from the said source computer.*

*29. A computer readable non-transitory medium on a source computer, the source computer including a source installation of a speech recognition computer program into which a user is enrolled and which has generated voice model files and enrollment entries associated with the user, the computer readable non-transitory medium storing program instructions comprising instructions that cause the source computer to:*

*a) record the user's voice model files and enrollment entries,*

*b) store the user's voice model files and enrollment entries in recoverable form as the user's Voice Model, and*

*c) transfer the user's stored Voice Model to a destination computer, the destination computer including a destination installation of the speech recognition computer program;*

*wherein the transfer of the user's Voice Model to the destination computer enables the destination computer to enroll the user into the speech recognition computer program on the destination computer and increases the accuracy of the speech recognition computer program on the destination computer.*

*30. A medium as recited in claim 29 wherein the computer readable non-transitory medium further comprises instructions that cause the source computer to identify the speech recognition computer program installed on the source computer.*

*31. A medium as recited in claim 29 wherein the computer readable non-transitory medium further comprises instructions that cause the source computer to identify the users that have previously been enrolled.*

*32. A medium as recited in claim 29 wherein the computer readable non-transitory medium further comprises instructions that cause the source computer to copy speech recognition training files to the destination computer.*

*33. A medium as recited in claim 29 wherein the computer readable non-transitory medium further comprises instructions that cause the destination computer to install a Voice Model received from the source computer.*

*34. A computer readable non-transitory medium on a destination computer, the destination computer including a destination installation of a speech recognition computer program, the computer readable non-transitory medium storing program instructions comprising instructions that cause the destination computer to:*

*a) receive voice model files and enrollment entries associated with a user from a source computer, the voice model files and enrollment entries having been generated by a source installation of the speech recognition computer program on the source computer into which the user is enrolled; and*

*b) enroll the user on said destination computer, using the user's stored enrollment entries and the first user's user voice model files transferred from the source computer*

*wherein the enrollment of the user on the destination computer enables the user to have access to the speech recognition computer program on the destination computer and increases the accuracy of the speech recognition computer program on the destination computer.*

*35. A medium as recited in claim 34 wherein the computer readable non-transitory medium further comprises instructions that cause the destination computer to identify the speech recognition computer program installed on the destination computer.*

*36. A medium as recited in claim 34 wherein the computer readable non-transitory medium further comprises instructions that cause the destination computer to identify the users that have previously been enrolled on the destination computer.*

*37. A medium as recited in claim 34 wherein the computer readable non-transitory medium further comprises instructions that cause the destination computer to copy speech recognition training files from the source computer to the destination computer.*

*38. A medium as recited in claim 34 wherein the computer readable non-transitory medium further comprises instructions that cause the destination computer to install a Voice Model received from the source computer on the destination*

*computer, the Voice Model, including user parameters, files, and vocabularies from the said source computer.*

*39. A method for transferring a voice model associated with a user of a speech recognition computer program installed on a source computer to a destination computer to increase the accuracy of a speech recognition computer program installed on the destination computer, the method comprising the steps of:*

*a) receiving, at the source computer, a request from the user to transfer the user's voice model to a second computer, the voice model comprising data stored in a memory of the source computer;*

*b) examining the memory of the source computer to identify and select the voice model data associated with the user that should be transferred;*

*c) copying the selected voice model files to a transfer medium for transfer to the destination computer;*

*d) retrieving, at the destination computer, the selected voice model files from the transfer medium;*

*e) installing the retrieved voice model files on the destination computer; and*

*f) enrolling the user into the speech recognition computer program on the destination computer.*

*40. A method as recited in claim 39, wherein the voice model data comprises one or more data groups selected from the group consisting of speech recognition training files, system registry parameters, user vocabularies, macros, user settings, and initialization files.*

*41. A method as recited in claim 39, wherein the transfer medium is selected from the group consisting of floppy disks, CDs, DVDs, networks, USB memory disks, other data transfer devices, and other memory devices.*

*42. A method as recited in claim 39, wherein the step of examining further comprises selecting the voice model data at least in part by accessing the system registry to identify the location in the memory of the user's voice model.*

*43. A method as recited in claim 39, wherein the step of copying further comprises generating an initialization file based on the selected voice model data; and the step of installing comprises using the initialization file to determine where the voice model data should be installed on the destination computer.*

*44. A method as recited in claim 39, wherein the step of copying further comprises generating a registry file, the registry file comprising entries from a system registry on the source computer; and the step of installing comprises updating a system registry on the destination computer based on the registry file on the source computer.*

*45. A method as recited in claim 39, wherein the step of enrolling comprises accessing the initialization file/registry file included in the voice model data from the source computer to configure the speech recognition computer program on the destination computer.*

*46. A method as recited in claim 39, wherein the step of examining further comprises identifying the speech recognition program installed on the source computer.*

*47. A method as recited in claim 39, wherein the step of installing further comprises identifying the speech recognition program installed on the destination computer.*

*48. A method as recited in claim 39, wherein the method further comprises identifying the existing users enrolled in the speech recognition program on the destination computer.*

*49. A method as recited in claim 39, wherein the method further comprises receiving a user name from the user to be used in enrolling the user into the program.*

*50. A method as recited in claim 39, wherein the method further comprises determining whether the program already includes an enrolled user with the user name and if so, prompting the user to indicate whether to overwrite the existing user or enroll under a different user name.*

*51. A computer readable non-transitory medium on a source computer, the source computer including a source installation of a speech recognition computer program into which a user is enrolled and which has generated a voice model associated with the user, the computer readable non-transitory medium storing program instructions comprising instructions that cause the first computer to:*

*a) receive a request from the user to transfer, the request comprising an indication of the voice model to transfer and a transfer medium to be used;*

*b) examine the memory to identify and select the data to transfer;*

*c) package the selected data into a format for use by a destination computer;*

*d) copy the packaged data to a transfer medium for transfer; and*

*e) transfer the packed data from the transfer medium to the destination computer;*

*wherein the transfer of the packaged data to the destination computer enables the destination computer to enroll the user into the speech recognition computer program on the destination computer and increase the accuracy of the speech recognition computer program on the destination computer.*

*52. A method as recited in claim 51, wherein the voice model data comprises one or more data groups selected from the group consisting of speech recognition training files, system registry parameters, user vocabularies, macros, user settings, and initialization files.*

*53. A method as recited in claim 51, wherein the transfer medium is selected from the group consisting of floppy disks, CDs, DVDs, networks, USB memory disks, other data transfer devices, and other memory devices.*

*54. A method as recited in claim 51, wherein the step of examining further comprises selecting the voice model data at least in part by accessing the system registry to identify the location in the memory of the user's voice model.*

*55. A method as recited in claim 51, wherein the step of copying further comprises generating an initialization file based on the selected voice model data; and the step of installing comprises using the initialization file to determine where the voice model data should be installed on the destination computer.*

*56. A method as recited in claim 51, wherein the step of copying further comprises generating a registry file, the registry file comprising entries from a system registry on the source computer; and the step of installing comprises updating a system registry on the destination computer based on the registry file on the source computer.*

*57. A method as recited in claim 51, wherein the step of enrolling comprises accessing the initialization file/registry file included in the voice model data from the source computer to configure the speech recognition computer program on the destination computer.*

*58. A method as recited in claim 51, wherein the step of examining further comprises identifying the speech recognition program installed on the source computer.*

*59. A method as recited in claim 51, wherein the step of installing further comprises identifying the speech recognition program installed on the destination computer.*

*60. A method as recited in claim 51, wherein the method further comprises identifying the existing users enrolled in the speech recognition program on the destination computer.*

*61. A method as recited in claim 51, wherein the method further comprises receiving a user name from the user to be used in enrolling the user into the program.*

*62. A method as recited in claim 51, wherein the method further comprises determining whether the program already includes an enrolled user with the user name and if so, prompting the user to indicate whether to overwrite the existing user or enroll under a different user name.*

*63. A computer readable non-transitory medium on a destination computer, the destination computer including a destination installation of a speech recognition computer program, the computer readable non-transitory medium storing program instructions, comprising instructions that cause the first computer to:*

*a) receive a request from a user to load a voice model, the voice model comprising data generated by a speech recognition program installed on a source computer;*

*b) retrieve voice model data from a transfer medium to the destination computer, the voice model data being associated with the voice model selected by the user:*

*c) determine whether the user has previously been enrolled in the speech recognition program on the destination computer;*

*d) prompt, in response to determining that the user was previously enrolled in the speech recognition program on the destination computer, the user to indicated whether to overwrite existing voice model data on the destination computer;*

*e) install the voice model data on the destination computer;*

*f) enroll the user in the speech recognition program on the destination computer;*

*wherein the enrollment of the user on the destination computer enables the user to have access to the speech recognition computer program on the destination computer and increases the accuracy of the speech recognition computer program on the destination computer.*

*64. A method as recited in claim 63, wherein the voice model data comprises one or more data groups selected from the group consisting of speech recognition training files, system registry parameters, user vocabularies, macros, user settings, and initialization files.*

*65. A method as recited in claim 63, wherein the transfer medium is selected from the group consisting of floppy disks, CDs, DVDs, networks, USB memory disks, other data transfer devices, and other memory devices.*

*66. A method as recited in claim 63, wherein the step of examining further comprises selecting the voice model data at least in part by accessing the system registry to identify the location in the memory of the user's voice model.*

*67. A method as recited in claim 63, wherein the step of copying further comprises generating an initialization file based on the selected voice model data; and the step of installing comprises using the initialization file to determine where the voice model data should be installed on the destination computer.*

*68. A method as recited in claim 63, wherein the step of copying further comprises generating a registry file, the registry file comprising entries from a system registry on the source computer; and the step of installing comprises updating a system registry on the destination computer based on the registry file on the source computer.*

*69. A method as recited in claim 63, wherein the step of enrolling comprises accessing the initialization file/registry file included in the voice model data from the source computer to configure the speech recognition computer program on the destination computer.*

*70. A method as recited in claim 63, wherein the step of examining further comprises identifying the speech recognition program installed on the source computer.*

*71. A method as recited in claim 63, wherein the step of installing further comprises identifying the speech recognition program installed on the destination computer.*

*72. A method as recited in claim 63, wherein the method further comprises identifying the existing users enrolled in the speech recognition program on the destination computer.*

*73. A method as recited in claim 63, wherein the method further comprises receiving a user name from the user to be used in enrolling the user into the program.*

*74. A method as recited in claim 63, wherein the method further comprises determining whether the program already includes an enrolled user with the user name and if so, prompting the user to indicate whether to overwrite the existing user or enroll under a different user name.*

* * * * *